United States Patent
Kamio (10) Patent No.: US 10,871,223 B2
(45) Date of Patent: Dec. 22, 2020

(54) SHIFT RANGE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/682,152

(22) Filed: Nov. 13, 2019

(65) Prior Publication Data

US 2020/0080635 A1    Mar. 12, 2020

Related U.S. Application Data

(63) Continuation of application No. PCT/JP2018/026796, filed on Jul. 18, 2018.

(30) Foreign Application Priority Data

Jul. 21, 2017  (JP) ................. 2017-141606

(51) Int. Cl.
*F16H 61/32*  (2006.01)
*H02P 25/16*  (2006.01)

(52) U.S. Cl.
CPC ............ *F16H 61/32* (2013.01); *H02P 25/16* (2013.01); *F16H 2061/326* (2013.01)

(58) Field of Classification Search
CPC ................................ H02P 25/16; F16H 61/32
USPC ..................................................... 318/98, 34
See application file for complete search history.

(56) References Cited

U.S. PATENT DOCUMENTS

| | | | |
|---|---|---|---|
| 7,781,996 B2 * | 8/2010 | Tajima | ............... H02P 23/14 318/268 |
| 2003/0222617 A1 | 12/2003 | Nakai et al. | |
| 2006/0033464 A1 | 2/2006 | Nakai et al. | |
| 2006/0197489 A1 | 9/2006 | Nakai et al. | |
| 2007/0182353 A1 | 8/2007 | Kamio et al. | |
| 2009/0193923 A1 | 8/2009 | Nakai et al. | |
| 2011/0068730 A1 | 3/2011 | Nakai et al. | |

FOREIGN PATENT DOCUMENTS

| | | |
|---|---|---|
| JP | 4187619 | 11/2008 |
| JP | 2018-44667 | 3/2018 |

* cited by examiner

*Primary Examiner* — David Luo
(74) *Attorney, Agent, or Firm* — Nixon & Vanderhye PC (57) ABSTRACT

A shift range control device switches a shift range by controlling driving of a motor in a shift range switching system, in which a play exists between a motor shaft which is a rotation shaft of a motor and an output shaft to which the rotation of the motor is transmitted. A parameter calculation unit calculates a motor angle, a motor speed and a motor acceleration based on a motor rotation angle signal acquired from a motor rotation angle sensor which detects a rotation position of the motor. An idling check unit checks an end of idle rotation, in which the motor rotates within a range of the play, based on the motor speed and the motor acceleration. A target setting unit sets a motor angle target value related to drive control on the motor, by using an angle correction value which is a value corresponding to the motor angle at the end of the idle rotation. A drive control unit controls the driving of the motor such that the motor angle becomes the motor angle target value.

10 Claims, 9 Drawing Sheets

SHIFT RANGE CONTROL DEVICE

CROSS REFERENCE TO RELATED APPLICATION

The present application is a continuation of International Patent Application No. PCT/JP2018/026796 filed on Jul. 18, 2018, which designated the U.S. and claims the benefit of priority from Japanese Patent Application No. 2017-141606 filed on Jul. 21, 2017. The entire disclosures of all of the above applications are incorporated herein by reference.

FIELD

The present disclosure relates to a shift range control device.

BACKGROUND

Conventionally, a shift range switching device, which switches a shift range by controlling a motor in accordance with a shift range switching request from a driver, is known. For example, butting control is executed at startup to learn an amount of play. In the butting control, the motor is rotated to a limit position of a movable range with a relatively large torque.

SUMMARY

A shift range control device according to the present disclosure switches a shift range by controlling driving of a motor in a shift range switching system, in which play exists between a motor shaft which is a rotation shaft of the motor and an output shaft to which rotation of the motor is transmitted. The shift range control device is configured to execute processes of parameter calculation, idling check, target setting and drive control.

BRIEF DESCRIPTION OF THE DRAWINGS

The above and other objects, features and advantages of the present disclosure will become more apparent from the following detailed description made with reference to the accompanying drawings. In the drawings.

EMBODIMENT

First Embodiment

Figure 1:
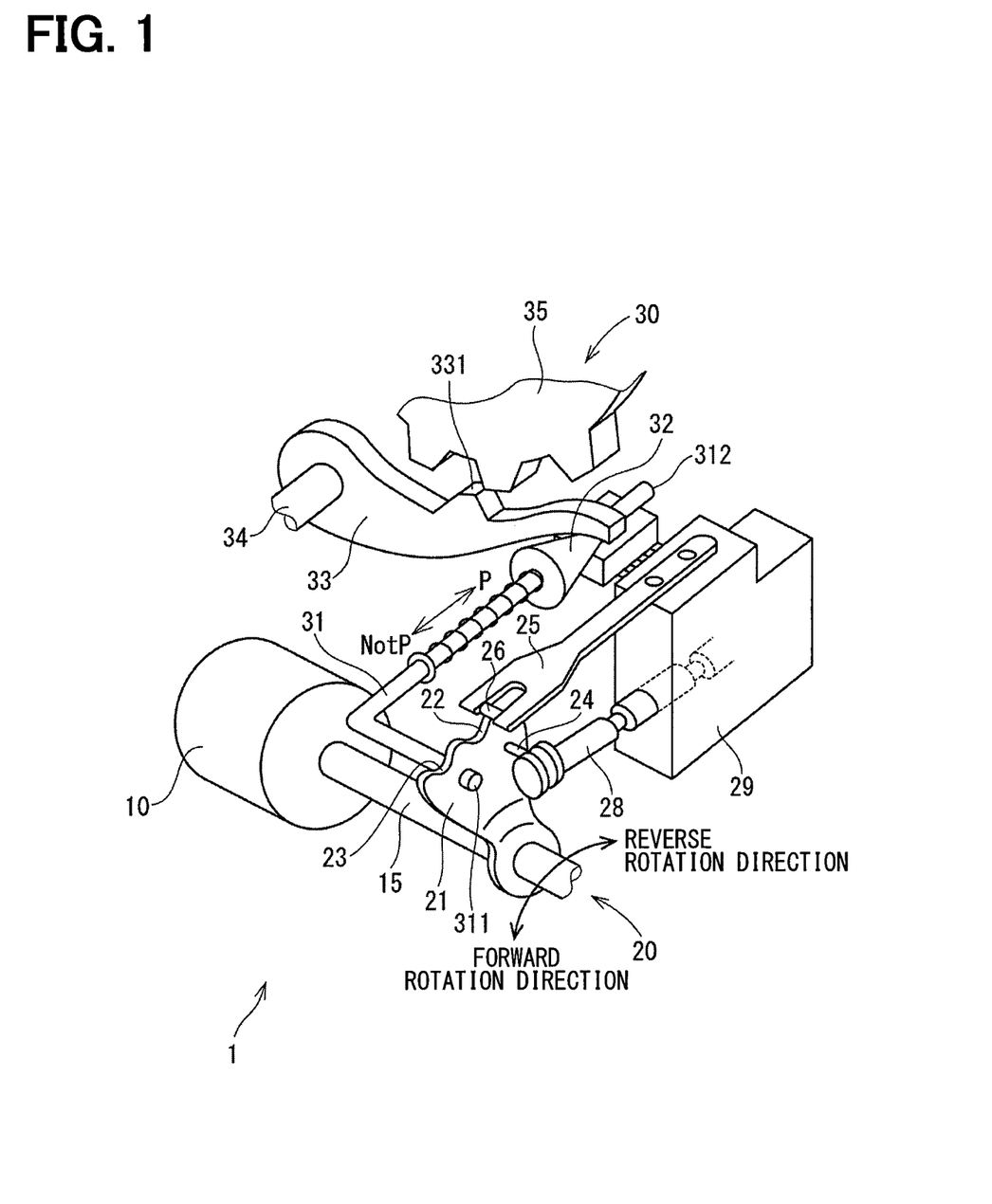
FIG. 1 is a perspective view showing a shift-by-wire system according to a first embodiment.
Figure 2:
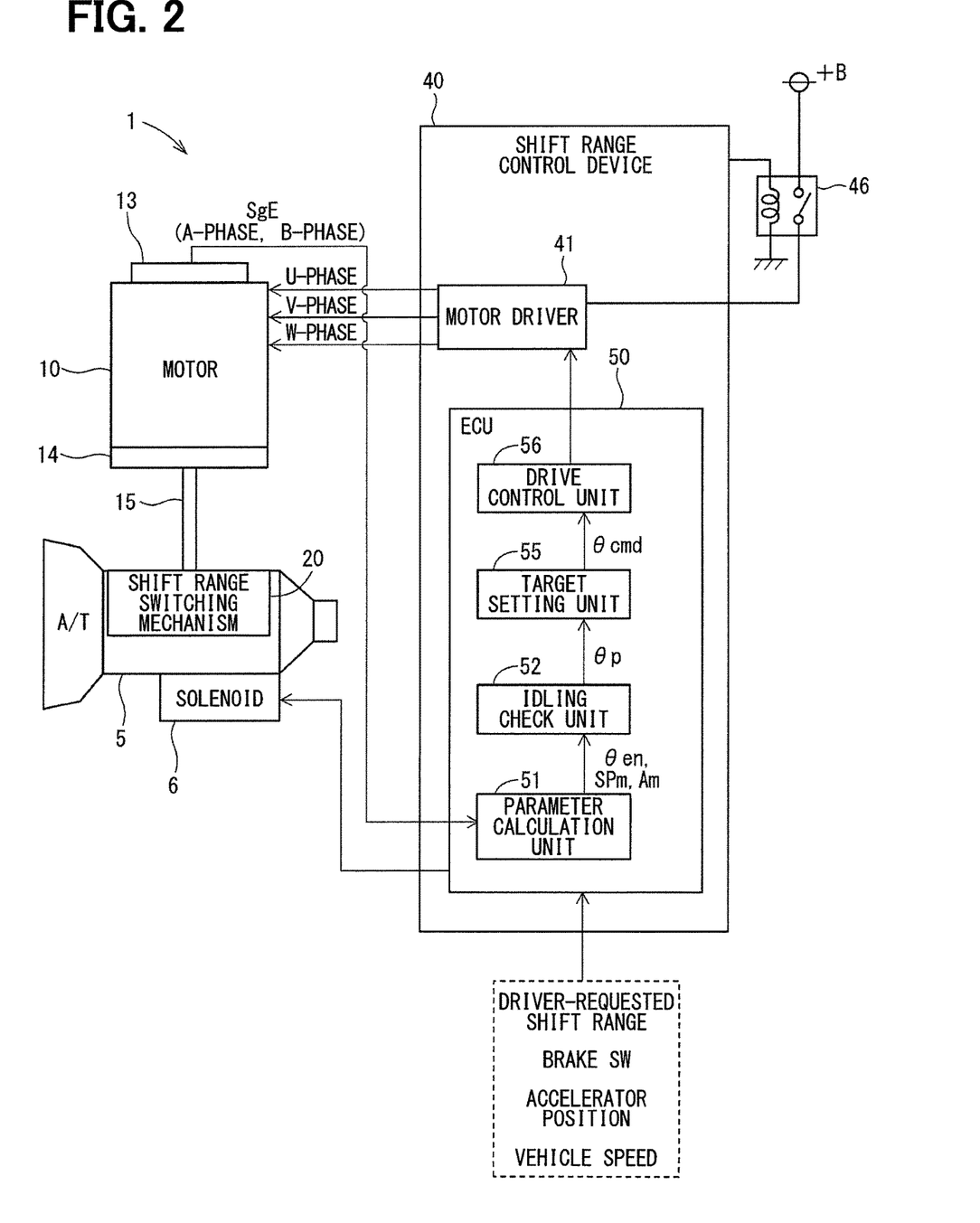
FIG. 2 is a general structural diagram showing the shift-by-wire system according to the first embodiment.

A shift range control device will be hereinafter described with reference to the drawings. In the following plural embodiments, substantially same structural parts are designated with the same reference numerals thereby to simplify the description. As shown in FIG. 1 and FIG. 2, a shift-by-wire system 1 as a shift range switching system includes a motor 10, a shift range switching mechanism 20, a parking lock mechanism 30, a shift range control device 4 and the like. The motor 10 is rotated by power supplied from a battery which is installed in a vehicle (not shown) and functions as a drive source of the shift range switching mechanism 20. The motor 10 of the present embodiment is a permanent magnet type DC brushless motor.

As shown in FIG. 2, an encoder 13 as a motor rotation angle sensor detects a rotation position of a rotor (not shown) of the motor 10. The encoder 13 is a magnetic type rotary encoder, for example, and includes a magnet rotating integrally with the rotor, a Hall IC for detecting magnetism or the like. The encoder 13 outputs A-phase and B-phase pulse signals for each predetermined angle in synchronism with the rotation of the rotor. Hereinafter, the signals from the encoder 13 are referred to as a motor rotation angle signal SgE.

A speed reducer 14 is provided between a motor shaft of the motor 10 and an output shaft 15 and outputs the rotation of the motor 10 to the output shaft 15 after speed reduction. The rotation of the motor 10 is thus transmitted to the shift range switching mechanism 20. In the present embodiment, an output shaft sensor for detecting a rotation position of the output shaft 15 is omitted.

As shown in FIG. 1, the shift range switching mechanism 20 includes a detent plate 21, a detent spring 25 and the like. The shift range switching mechanism 20 transmits the rotational drive force output from the speed reducer 14 to a manual valve 28 and the parking lock mechanism 30. The detent plate 21 is fixed to the output shaft 15 and driven by the motor 10. In the present embodiment, a direction in which the detent plate 21 is away from a base portion of the detent spring 25 is defined as a forward rotation direction and a direction approaching the base portion is defined as a reverse rotation direction.

The detent plate 21 has a pin 24 protruding in parallel with the output shaft 15. The pin 24 is connected to the manual valve 28. As the detent plate 21 is driven by the motor 10, the manual valve 28 reciprocates in an axial direction. That is, the shift range switching mechanism 20 converts the rotational movement of the motor 10 into the linear movement and transmits the linear movement to the manual valve 28. The manual valve 28 is provided to a valve body 29. The reciprocating movement in the axial direction of the manual valve 28 switches hydraulic pressure supply paths to a hydraulic clutch (not shown) to switch an engagement state of the hydraulic clutch, so that the shift range is switched. Two valley sections 22 and 23 are provided on the detent spring 25 side of the detent plate 21. In the present embodiment, the side closer to the base portion of the detent spring 25 is referred to as the valley section 22, and the side away from the base portion of the detent spring 25 is referred to as the valley section 23. In the present embodiment, the valley section 22 corresponds to a NotP range other than a P range, and the valley section 23 corresponds to the P range.

The detent spring 25 is an elastically deformable plate-like member, and is provided with a detent roller 26 at a tip of the detent spring 25. The detent spring 25 presses the detent roller 26 toward the rotation center of the detent plate 21. When a predetermined or more rotating force is applied to the detent plate 21, the detent spring 25 elastically deforms, and the detent roller 26 moves between the valley sections 22 and 23. When the detent roller 26 is fitted into any one of the valley sections 22 and 23, a swing motion of the detent plate 21 is regulated, the axial position of the manual valve 28 and a state of the parking lock mechanism 30 are determined, and the shift range of an automatic transmission 5 is fixed. The detent roller 26 fits into the valley section 22 when the shift range is the NotP range, and fits into the valley section 23 when the shift range is the P range.

The parking lock mechanism 30 includes a parking rod 31, a conical member 32, a parking lock pawl 33, a shaft part 34 and a parking gear 35. The parking rod 31 is generally L-shaped, and one end 311 side is fixed to the detent plate 21. The conical member 32 is provided to the other end 312 side of the parking rod 31. The conical member 32 is formed so as to contract toward the other end 312 side. When the detent plate 21 pivots in the reverse rotation direction, the conical member 32 moves in a P direction.

The parking lock pawl 33 is provided to abut on a conical surface of the conical member 32 and pivot about the shaft 34. On the parking gear 35 side of the parking lock pawl 33, a protrusion 331 is provided to be engageable with the parking gear 35. When the detent plate 21 rotates in the reverse rotation direction and the conical member 32 moves in the P direction, the parking lock pawl 33 is pushed up so that the protrusion 331 is engaged with the parking gear 35. On the contrary, when the detent plate 21 rotates in the forward rotation direction and the conical member 32 moves in the NotP direction, the protrusion 331 is released from engagement with the parking gear 35.

The parking gear 35 is provided on an axle (not shown) to be capable of engagement with the protrusion 331 of the parking lock pawl 33. When the parking gear 35 and the protrusion 331 are engaged with each other, the rotation of the axle is regulated. When the shift range is the NotP range, the parking gear 35 is not locked by the parking lock pawl 33 and the rotation of the axle is not restricted by the parking lock mechanism 30. When the shift range is the P range, the parking gear 35 is locked by the parking lock pawl 33 and the rotation of the axle is restricted.

As shown in FIG. 2, the shift range control device 40 includes a motor driver 41, an electronic control unit (referred to as ECU) 50 and the like. The motor driver 41 outputs a drive signal related to energization of each phase (U-phase, V-phase, W-hase) of the motor 10. A motor relay 46 is provided between the motor driver 41 and a battery. The motor relay 46 is turned on while a start switch of a vehicle, such as an ignition switch, is turned on, so that power is supplied to the motor 10 side. The motor relay 46 is turned off when the start switch is turned off, so that current supply to the motor 10 side is shut down.

The ECU 50 is mainly formed of a microcomputer or the like, and internally includes, although not shown, a CPU, a ROM, a RAM, an I/O, a bus line for connecting these components, and the like. Each process executed by the ECU 50 may be software processing or may be hardware processing. In case of the software processing, the software processing may be implemented by causing the CPU to execute a program. The program may be stored beforehand in a memory device such as a ROM, that is, in a readable non-transitory tangible storage medium. The hardware processing may be implemented by a special purpose electronic circuit.

The ECU 50 controls the switching of the shift range by controlling driving of the motor 10 based on a driver-requested shift range, a signal from a brake switch, a vehicle speed and the like. The ECU 50 further controls the driving of a transmission hydraulic pressure control solenoid 6 based on the vehicle speed, an accelerator position, the driver-requested shift range and the like. By controlling the transmission hydraulic pressure control solenoid 6, the shift stage is controlled. The transmission hydraulic pressure control solenoid 6 is provided in number in correspondence to the number of the shift ranges and the like. In the present embodiment, one ECU 50 controls the driving of the motor 10 and the solenoid 6. However, the ECU 50 may be divided into a motor ECU for motor control and an AT-ECU for solenoid control. Hereinafter, the drive control for the motor 10 will be mainly described.

As shown in FIG. 2, the ECU 50 includes a parameter calculation unit 51, an idling check unit 52, a target setting unit 55, a drive control unit 56 and the like, which correspond to the software processing of parameter calculation, idling check, target setting and drive control, respectively. That is, the ECU 50 is configured to execute the parameter calculation, the idling check, the target setting and the drive control. The parameter calculation unit 51 calculates an encoder count value θen, which is a count value of the encoder 13, based on the motor rotation angle signal SgE output from the encoder 13. The encoder count value θen is a value which corresponds to actual mechanical angle and an electrical angle of the motor 10. In the present embodiment, the encoder count value θen corresponds to the motor angle. The encoder count value θen is calculated in response to each interrupt at an edge of the motor rotation angle signal SgE.

The parameter calculation unit 51 calculates the motor speed SPm [deg/s] (see equation (1)) at each edge interrupt of the motor rotation angle signal SgE. The constant k in the equation is the motor rotation angle corresponding to one count of the encoder count value θen, $t_{(n)}$ is the current interrupt time, and $t_{(n-1)}$ is the previous interrupt time. The motor speed SPm can also be regarded as the amount of change in the motor angle per unit time.

$$SPm = k/(t_{(n)} - t_{(n-1)}) \qquad (1)$$

The parameter calculation unit 51 calculates a motor acceleration Am [deg/s$^2$] (see equation (2)) at a predetermined cycle period. Pc in the equation is the time of one calculation cycle period, $SPm_{(n)}$ is the motor speed at the time of the current calculation, and $SPm_{(n-1)}$ is the motor speed at the time of the previous calculation. The motor speed SPm and the motor acceleration Am may be calculated in any manner, for example, as a derivative of the motor angle. Also, the calculation cycle period and the like can be set arbitrarily. The values calculated by the parameter calculation unit 51 are used in various control calculations and the like.

$$Am = (SPm_{(n)} - SPm_{(n-1)})/Pc \qquad (2)$$

The idling check unit 52 checks whether the motor 10 is idling, that is, the motor 10 is rotating idly within a range of the play between the motor shaft 105 and the output shaft 15, based on the encoder count value θen, the motor speed SPm, and the motor acceleration Am. In particular, the idling check unit 52 detects the timing at which the idling state ends by checking the idling. The target setting unit 55 sets the target shift range based on the driver-requested shift range determined by the shift switch or the like, the vehicle speed, the signal from the brake switch and the like. Further, the target setting unit 55 sets a target count value θcmd, which is a motor angle command value, according to the target shift range. The drive control unit 56 controls the drive of the motor 10 by feedback control or the like so that the motor 10 is stopped at the rotation position where the encoder count value θen equals the target count value θcmd. Details of the drive control for the motor 10 are not limited in particular. In FIG. 2, in order to avoid complication, some control lines are not shown.

Figure 3:
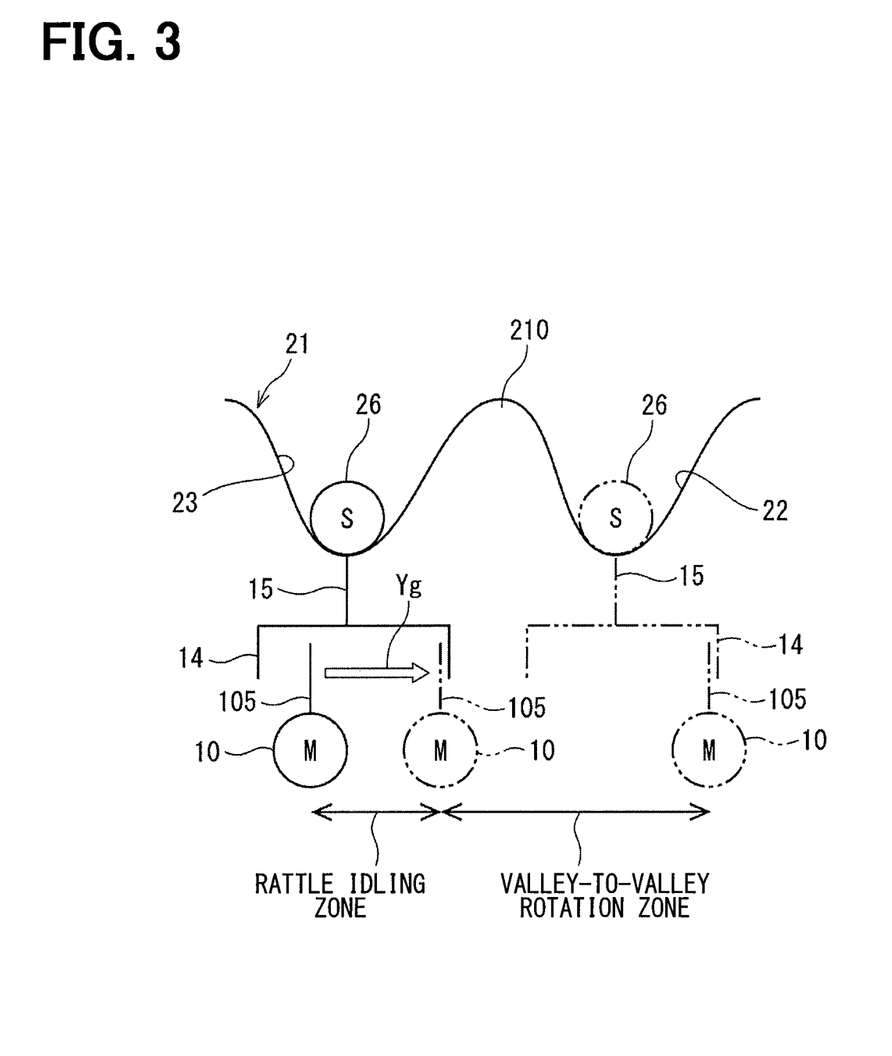
FIG. 3 is a schematic view illustrating a play between a motor and an output shaft according to the first embodiment.

Here, the relationship among the motor shaft 105 which is a rotating shaft of the motor 10, the output shaft 15, and the detent plate 21 is shown in FIG. 3. In FIG. 3, the detent roller 26 is schematically shown as being fitted in the valley sections 22 and 23 corresponding to the driver-requested shift range by riding over a ridge section 210 between the valley sections 22 and 23 of the detent plate 21 from a state indicated with a solid line to a state indicated with two-dot chain line when the motor 10 is rotated. Here, switching from the P range to the notP range will be described as an example. In FIG. 3, the rotational directions of the motor 10 and the output shaft 15 will be described as right and left directions in the drawing. Here, FIG. 3 is a schematic view illustrating the play conceptually assuming that the output shaft 15 and the speed reducer 14 are integrated with each other and that the motor shaft 105 is movable within a range of play of the speed reducer 14. However, it may alternatively be configured such that the motor shaft 105 and the speed reducer 14 are integrated with each other and a play exists between the speed reducer 14 and the output shaft 15.

As shown in FIG. 3, the speed reducer 14 is provided between the motor shaft 105 and the output shaft 15, and the play including a gear backlash exists between the motor shaft 105 and the output shaft 15. In the present embodiment, the motor 10 is a DC brushless motor. Therefore, when power is not supplied to the motor 10, the motor shaft 105 rotates within the play because of influence of a cogging torque, for example, and the motor shaft 105 and the output shaft 15 tend to be separated.

Further, as shown by an arrow Yg, when the motor 10 rotates in a state in which the motor shaft 105 and the reduction gear 14 are separated in the rotation direction, the motor 10 is rotated idly until the motor shaft 105 and the reduction gear 14 abut. In this case, the rotation of the motor 10 is not transmitted to the output shaft 15 side. Hereinafter, a state in which the rotation of the motor 10 is not transmitted to the output shaft 15 within the range of the play is referred to as a rattle idling, and a zone of the rattle idling state is referred to as an idling zone. In addition, the end of the rattle idling state is referred to as a rattle end.

When the rattle idling is finished, the motor 10, the output shaft 15 and the detent plate 21 rotate integrally. As a result, the detent roller 26 moves beyond the ridge section 210 between the valley sections 22 and 23 to the valley section 22. A section in which the detent roller 26 moves between the valley sections 22 and 23 after the end of the rattle idling state is referred to as a valley-to-valley rotation zone. Further, a zone from the end of the rattle idling state to the point before riding over the top of the ridge section 210 is referred to as an integral rotation zone.

When current supply is started to energize the motor 10 to switch the shift range from the state where the motor 10 is not supplied with power, it is difficult to specify which position in the range of the play the motor shaft 105 is in. In addition, when the motor shaft 105 and the speed reduction 14 are separated in the rotational direction side, the motor 10 needs to be rotated more, by an amount of the rattle idling, in comparison to a case where the motor 10 is rotated with the motor shaft 105 and the speed reducer 14 are in contact.

Therefore, in the present embodiment, the position control accuracy is secured by detecting the end of the rattle idling based on the encoder count value θen, the motor speed SPm and the motor acceleration Am and correcting the target count value θcmd. A target setting process in the present embodiment will be described with reference to a flowchart of FIG. 4. Hereinafter, "step" of step S101 is simply indicated as a symbol S. Other steps are also indicated simply as S. In the first S101, the idling check unit 52 acquires the encoder count value θen, the motor speed SPm and the motor acceleration Am calculated by the parameter calculation unit 51.

Figure 4:
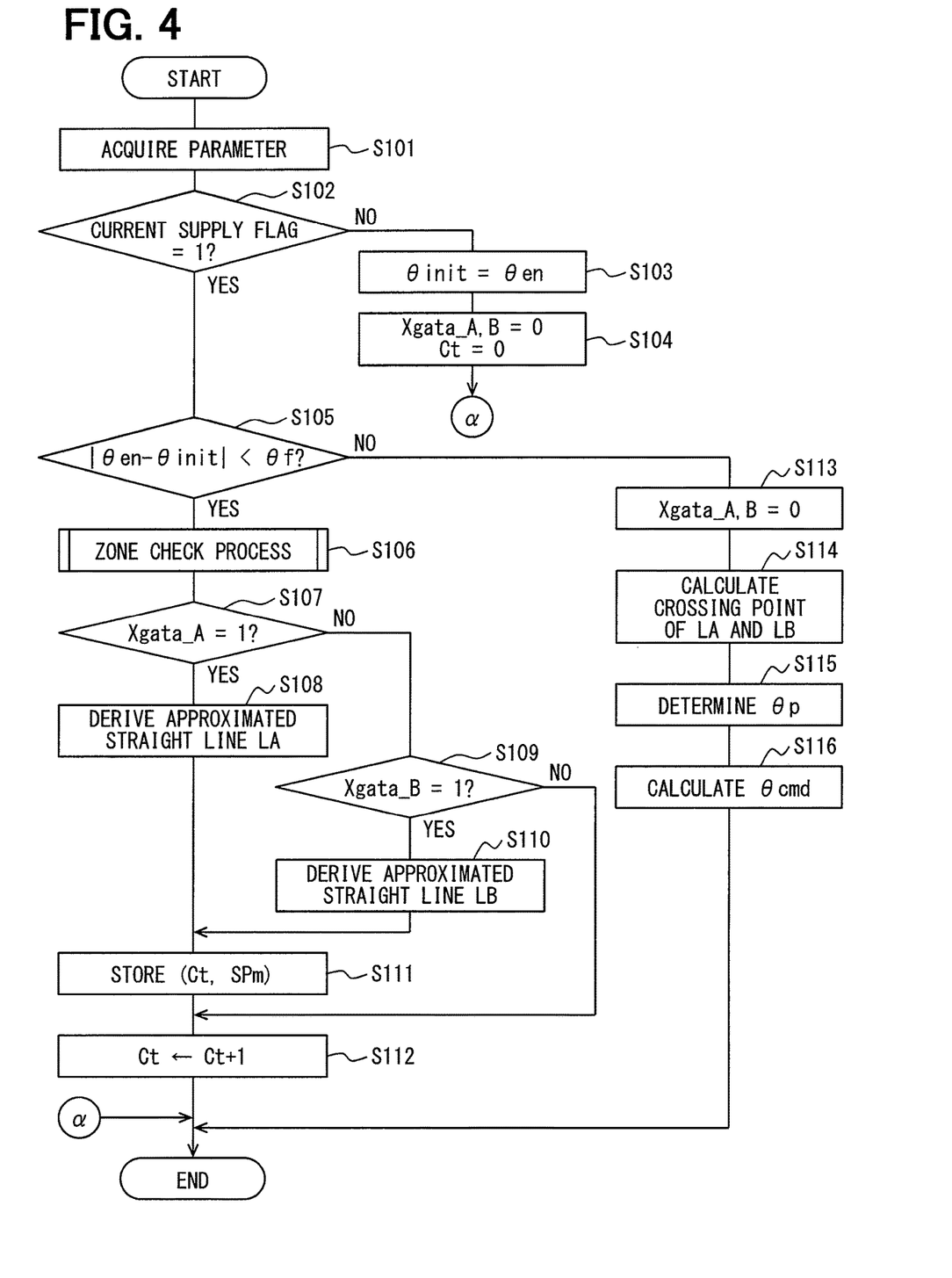
FIG. 4 is a flowchart showing a target angle setting process according to the first embodiment.

In S102, the idling check unit 52 checks whether a current supply flag has been turned on. The current supply flag is set when the target shift range is changed, and is reset after it is determined that the motor 10 has stopped. When the current supply flag is set, the target count value θcmd is set to a provisional value θt, and driving of the motor 10 is started. In the figure, a state where the flag has been set is assumed to be "1," and a state where it has not been set is assumed to be "0." In case it is determined that the current supply flag has been set (S102: YES), the process proceeds to S105. In case it is determined that the current supply flag has not been not set (S102: NO), the process proceeds to S103.

In S103, the idling check unit 52 stores the current encoder count value θen as a drive initial value θinit in a RAM or the like (not shown). In S104, the idling check unit 52 resets an idle flag Xgata_A indicating the idle zone, an integral rotation flag Xgata_B indicating an integral rotation zone, and a count value Ct of a time counter. Hereinafter, the idle flag is set as a flag A, and the integral rotation flag is set as a flag B.

In S105, to which the process proceeds in case it is determined that the current supply flag has been set (S102: YES), the idling check unit 52 checks whether an absolute value of a difference between the encoder count value θen and the drive initial value θinit is smaller than a drive initial check value θf. S105 is a step which checks whether the detent roller 26 is in the same valley section as before the shift range switching. The state that the detent roller 26 is in the same valley section as that before the shift range switching can be regarded as a range switching initial state before passing over the ridge section 210. The drive initial check value θf is set to a value according to the shift range before switching and the shape of the detent plate 21. In case it is determined that the absolute value of the difference between the encoder count value θen and the drive initial value θinit is smaller than the drive initial check value θf (S105: YES), the detent roller 26 is determined to be in the same valley section as before the shift range switching and the process proceeds to S106. If it is determined that the absolute value of the difference between the encoder count value θen and the drive initial value θinit is equal to or larger than the drive initial determination value θf (S105: NO), the process proceeds to S113.

In case it is determined that the absolute value of the difference between the encoder count value θen and the drive initial value θinit is less than the drive initial check value θf (S105: YES), that is, the detent roller 26 is in the same valley section as before the range switching, the idling check unit 52 executes a zone check process. The zone check process will be described with reference to a flowchart of FIG. 5.

Figure 5:
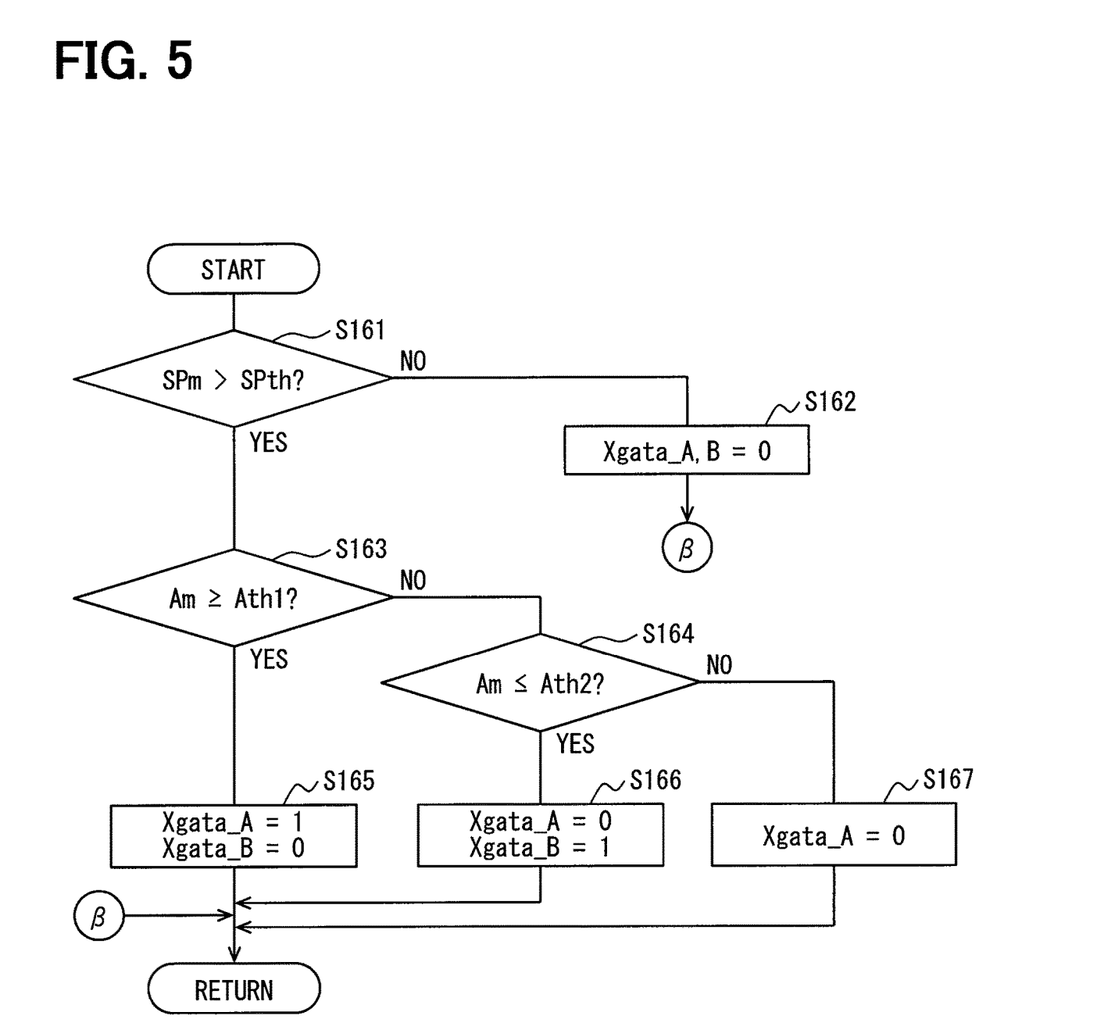
FIG. 5 is a flowchart explaining a zone check process according to the first embodiment.

In S161, the idling check unit 52 checks whether the motor speed SPm is larger than a speed check threshold value SPth. The speed check threshold value SPth is a value for checking whether the motor 10 is rotating, and is set to a relatively small value close to zero. In case it is determined that the motor speed SPm is equal to or smaller than the speed check threshold value SPth (S161: NO), the process proceeds to S162 and the flags A and B are reset. In case it is determined that the motor speed SPm is larger than the speed check threshold value SPth (S161: YES), the process proceeds to S163.

In S163, the idling check unit 52 checks whether the motor acceleration Am is equal to or larger than a first check threshold value Ath1. The first check threshold value Ath1 is a value for checking whether the motor 10 is in the idle state, and is arbitrarily set according to the performance or the like of the motor 10. In case it is determined that the motor acceleration Am is equal to or larger than the first check threshold value Ath1 (S163: YES), it is determined that the motor is in the idle zone, and the process proceeds to S165. In case it is determined that the motor acceleration Am is smaller than the first check threshold value Ath1 (S163: NO), the process proceeds to S164.

In S164, the idling check unit 52 checks whether the motor acceleration Am is equal to or smaller than a second check threshold value Ath2. The second check threshold value Ath2 is a value for checking whether the motor 10 is in the integral rotation state, and is arbitrarily set according to the performance or the like of the motor 10. The second check threshold value Ath2 is set to a value smaller than the first check threshold value Ath1. That is, Ath1>Ath2. In case it is determined that the motor acceleration Am is equal to or smaller than the second check threshold value Ath2 (S164: YES), it is determined that the motor is in the integral rotation zone, and the process proceeds to S166. In case it is determined that the motor acceleration Am is smaller than the second check threshold value Ath2 (S164: NO), the process proceeds to S167.

In S165, the idling check unit 52 sets the idle flag Xgata_A and resets the integral rotation flag Xgata_B. In S166, the idling check unit 52 resets the idle flag Xgata_A and sets the integral rotation flag Xgata_B. In S167, the idling check unit 52 resets the idle flag Xgata_A. After S165 to S167, the process proceeds to S107 of FIG. 4.

In S107, in which the process proceeds to the section determination process, the idle running determination unit 52 determines whether the free running flag Xgata_A is set. In case it is determined that the idle flag Xgata_A has not been set (S107: NO), the process proceeds to S109. In case it is determined that the idle flag Xgata_A has been set (S107: YES), the process proceeds to S108.

In S108, the idling check unit 52 derives an approximated straight line of the motor speed SPm in the idle zone, with the count value Ct of the time counter as the x-coordinate and the motor speed SPm as the y-coordinate. The approximate straight line of the motor speed SPm in the idle zone is defined by the equation (3).

$$y=ax+b \quad (3)$$

In S109, the idling check unit 52 checks whether the integral rotation flag Xgata_B has been set. In case it is determined that the idle flag Xgata_B has not been set (S109: NO), the process proceeds to S112. In case it is determined that the integral rotation flag Xgata_B has been set (S109: YES), the process proceeds to S109.

In S110, the idling check unit 52 derives an approximated straight line of the motor speed SPm in the integral rotation zone, with the count value Ct of the time counter as the x-coordinate and the motor speed SPm as the y-coordinate. The approximated straight line of the motor speed SPm in the integral rotation zone is defined by the equation (4).

$$y=cx+d \quad (4)$$

Hereinafter, the approximated straight line of the motor speed SPm in the idle rotation zone will be referred to as an approximated straight line LA, and the approximated straight line of the motor speed SPm in the integral rotation zone will be referred to as an approximated straight line LB. In the present embodiment, the approximated straight line LA corresponds to a first approximated line, and the approximated straight line LB corresponds to a second approximated line.

In S111, the idling check unit 52 stores the current count value Ct of the time counter and the motor speed SPm in a memory such as a RAM (not shown) in a manner associated with the states of the flags A and B. At S112, the count value Ct of the time counter is incremented.

In S113 to which the process proceeds in case the absolute value of the difference between the encoder count value θen and the drive initial value θinit is equal to or larger than the drive initial check value θf (S105: NO), the idling check unit 52 resets both flags A and B. In S114, the idling check unit 52 calculates a crossing point between the approximated straight lines LA and LB. In the present embodiment, it is determined that the idle rotation state ends at the timing when the motor speed SPm becomes an inflection point. The inflection point of the motor speed SPm is the crossing point of the approximated straight lines LA and LB. Assuming that the x-coordinate of the crossing point of the approximated straight lines LA and LB is a rattle end point XX", the rattle end point XX is expressed by the equation (5). In case XX becomes negative, XX is set to 0.

$$XX=(d-b)/(a-c) \quad (5)$$

In S115, the target setting unit 55 sets the encoder count value θen stored in association with the count value Ct which is closest to the rattle end point XX as the angle correction value θp. Since the count value Ct is a discrete value, the count value Ct closest to the rattle end point XX calculated by the equation (5) is regarded as the idle rotation end time, and the angle correction value θp is set based on the encoder count value θen at the time of the count value Ct.

In S116, the target setting unit 55 calculates the target count value θcmd using the angle correction value θp (see equation (6)). θdet in the equation is a design value of the valley-to-valley angle value, and is set according to the angle of the valley-to-valley rotation zone between the shift range before switching and the target shift range.

$$θcmd=θinit+θp+θdet \quad (6)$$

Here, the approximated straight lines LA and LB are derived in such a manner as described below. In the present embodiment, the count value Ct of the time counter and the motor speed SPm are stored in the mutually associated manner in S111. In the present embodiment, a plurality of points (Ct, SPm) associated with the idle rotation flag Xgata_A is used to perform linear approximation by, for example, the least squares method or the like to derive the approximated straight line LA. Further, the approximated straight line LB is derived by linear approximation, which is performed by, for example, the least squares method using a plurality of points (Ct, SPm) associated with the integral rotation flag Xgata_B. The approximated straight lines LA and LB may be derived by a method other than the least squares method. Further, the idle rotation end may be determined by using an approximated line derived by not only the linear approximation but also approximation of a quadratic or higher-order function.

Figure 6:
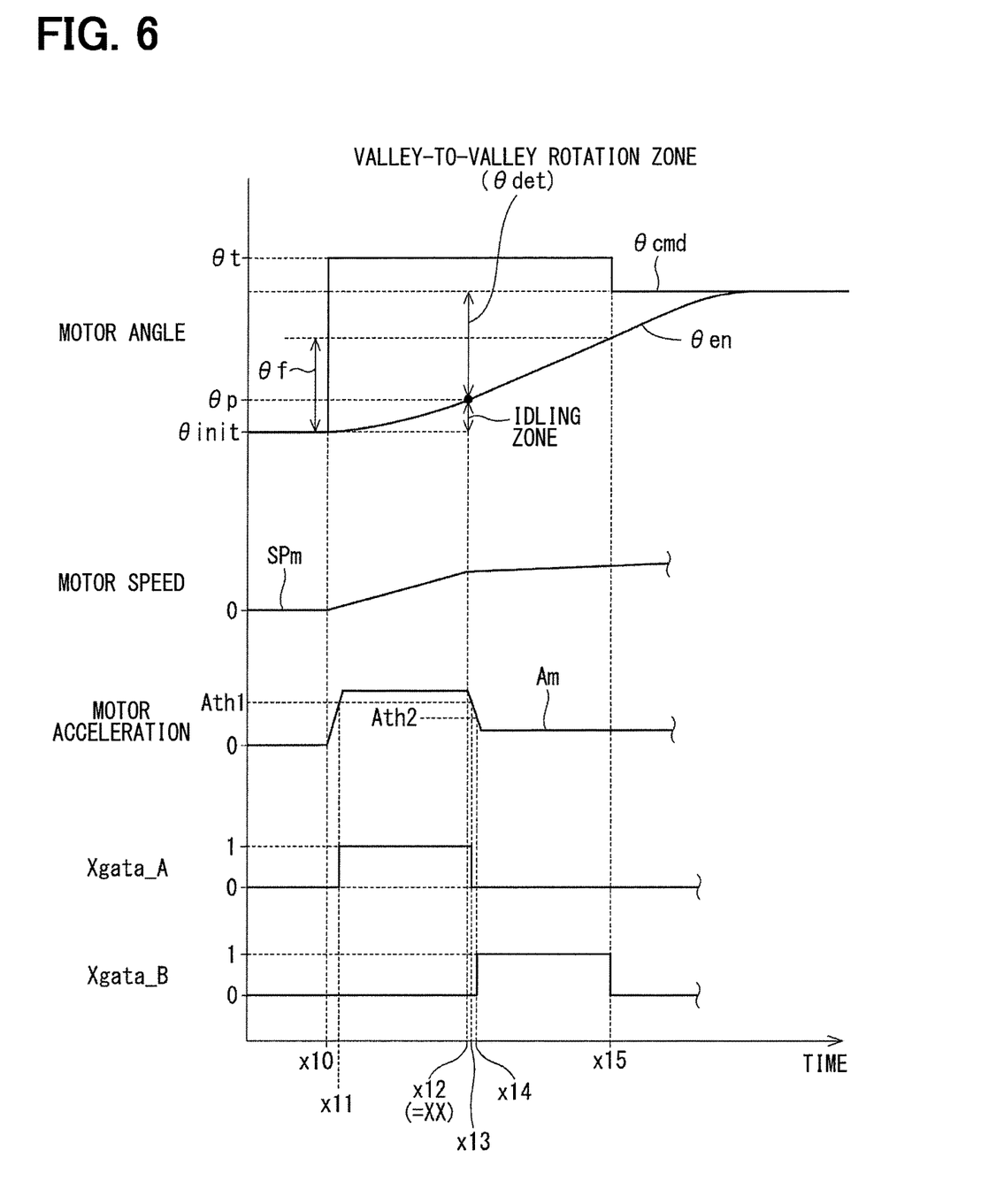
FIG. 6 is a time chart explaining a motor control process according to the first embodiment.
Figure 9:
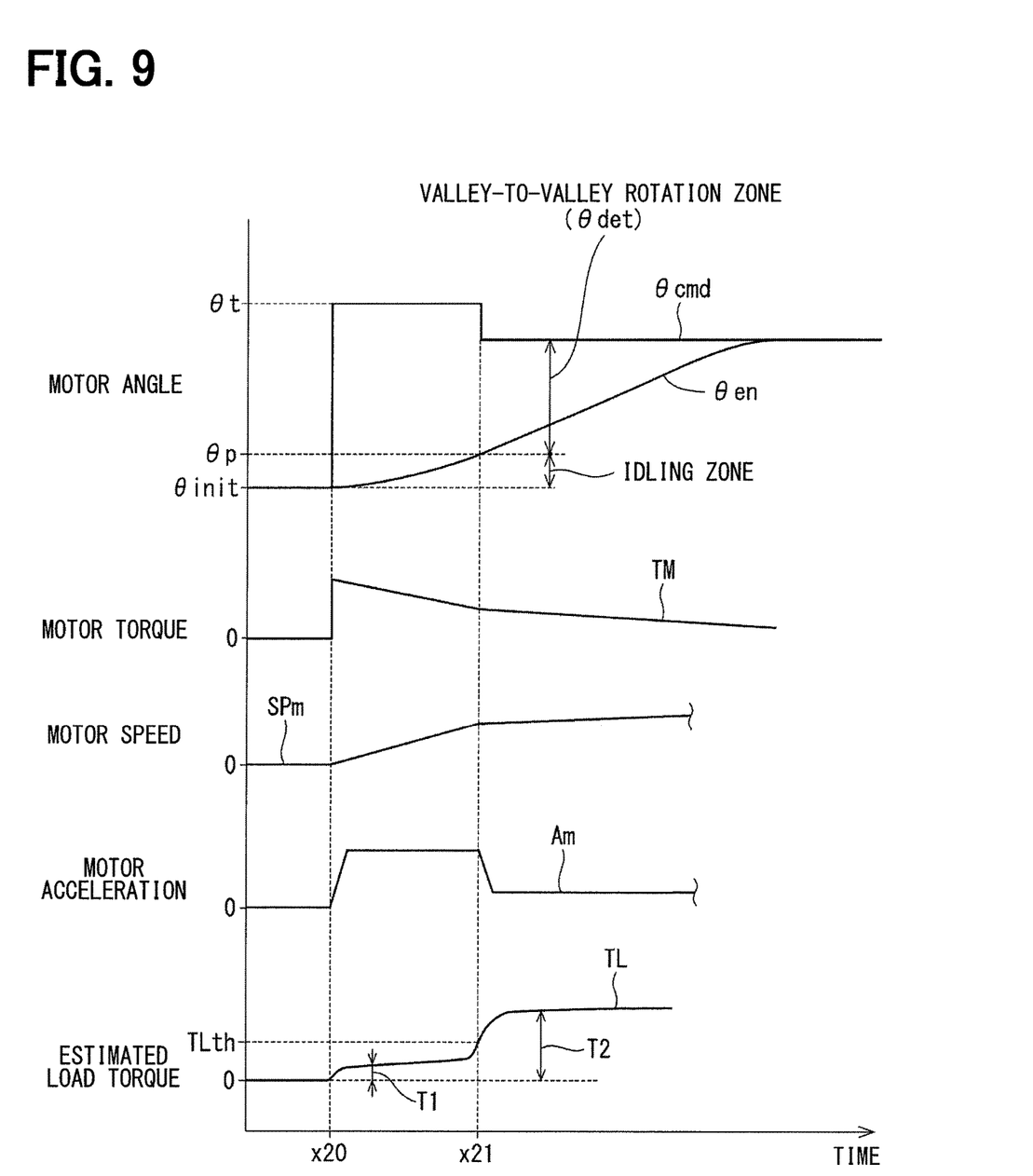
FIG. 9 is a time chart for explaining a motor control process according to the second embodiment.

The motor control process according to the embodiment will be explained with reference to a time chart of FIG. 6. In FIG. 6, the horizontal axis indicates time in common, and the vertical axis indicates from the top side the motor angle, the motor speed, the motor acceleration, the idle rotation flag Xgata_A and the integral rotation flag Xgata_B. In FIG. 6 and FIG. 9 referred to later, the time scale and the like are appropriately changed. When the target shift range is changed at time x10, the current supply flag is set, the target count value θcmd is set, and driving of the motor 10 is started. The target count value θcmd set here is a temporary value θt. Here, the motor 10 is assumed to rotate in the forward direction. When driving of the motor 10 is started, the encoder count value θen, the motor speed SPm and the motor acceleration Am increase. When the motor acceleration Am becomes equal to or larger than the first check threshold value Ath1 at time x11, the idle rotation flag Xgata_A is set. The approximated straight line LA is updated based on the points (Ct, SPm) during a period from time x11 to time x13, in which the idle rotation flag Xgata_A is set. When the idle rotation flag Xgata_A is reset at time x13, the approximated straight line LA is fixedly determined.

When the idle rotation zone ends and the motor shaft 105 comes to rotate integrally with the output shaft 15, the motor acceleration Am decreases. When the motor acceleration Am becomes equal to or smaller than the second check threshold value Ath2 at time x14, the integral rotation flag Xgata_B is set. The approximated straight line LB is updated based on the points (Ct, SPm) during a period from time x14 to time x15 at which the difference between the encoder count value θen and the drive initial value θinit becomes the drive initial check value θf. When integral rotation flag Xgata_B is reset at time x15, the approximated straight line LB is fixedly determined.

The idling check unit 52 calculates the rattle end point XX using the acquired approximated straight lines LA and LB. In FIG. 6, the rattle end point XX is assumed to be time x12. The idling check unit 52 sets the encoder count value θen at the rattle end point XX as the angle correction value θp. The target setting unit 55 calculates the target count value θcmd based on the angle correction value θp and the design value of the valley-to-valley angle θdet, and changes the target count value θcmd from the provisional value θt. In practice, there is a delay in calculation until the target count value θcmd is changed after the approximated straight line LB is fixedly determined at time x15. However, for simplification, it is assumed that the target count value θcmd is changed at time x15. In addition, the change of the target count value θcmd may be at any time before the detent roller 26 passes over the ridge section 210 of the detent plate 21.

As described above, the shift range control device 40 of the present embodiment switches the shift range by controlling driving of the motor 10 in the shift-by-wire system, in which there is the play between the motor shaft 105, that is, the rotation shaft of the motor 10, and the output shaft 15 to which the rotation of the motor 10 is transmitted. The shift range control device 40 includes the parameter calculation unit 51, the idling check unit 52, the target setting unit 55 and the drive control unit 56.

The parameter calculation unit 51 calculates the encoder count value θen, the motor speed SPm and the motor acceleration Am based on the motor rotation angle signal SgE acquired from the encoder 13 which detects the rotation position of the motor 10. The idling check unit 52 checks whether the motor 10 has rotated to the end of the idle rotation, in which the motor 10 rotates within the range of play, based on the motor speed SPm and the motor acceleration Am. The target setting unit 55 sets the target count value θcmd related to the drive control of the motor 10 by using the angle correction value θp that is the value corresponding to the encoder count value θen at the time of the end of the idle rotation. The drive control unit 56 controls the drive of the motor 10 such that the encoder count value θen attains the target count value θcmd.

In the present embodiment, the end of the idle rotation state is determined based on the encoder count value θen, the motor speed SPm, and the motor acceleration Am, and the target count value θcmd is set based on the encoder count value θen at the end of the idle rotation state. As a result, the target count value θcmd can be appropriately set without performing the learning process of the amount of play by butting control, and highly accurate positioning control can be realized. In addition, when performing the butting control, the detent mechanism is stressed because the detent roller 26 abuts the detent plate 21 with a relatively large torque. Therefore, when performing the butting control, it is necessary to design so that the detent mechanism etc. are not damaged. In the present embodiment, since the butting control is unnecessary, the shift range switching mechanism 20 can be simplified. Further, since an output shaft angle θs, which is the rotational position of the output shaft 15, is not used to set the target count value θcmd, an output shaft sensor for detecting the rotational position of the output shaft 15 need not be provided and the detection accuracy may be lowered.

The idling check unit 52 checks, based on the motor speed SPm and the motor acceleration Am, the idle rotation zone, in which the motor rotates idly, and the integral rotation zone, in which the motor shaft 105 and the output shaft 15 rotate integrally. The idling check unit 52 derives the approximated straight line LA, which is the approximated line that represents the change with time of the motor speed SPm in the idle rotation zone, and the approximated straight line LB that is the approximated line that represents the change with time of the motor speed SPm in the integral rotation zone. The idling check unit 52 determines that the idle rotation state has been finished at the rattle end point XX at which the approximated straight lines LA and LB cross each other.

In the present embodiment, the approximated straight lines LA and LB are determined by using the motor speeds SPm at the plurality of time points, and the idle rotation end determination is performed based on the crossing points to calculate the angle correction value θp. As a result, an erroneous determination of the idle rotation end caused by the influence of noise in the encoder 13 hardly occurs, and the accuracy of the idle rotation end determination and the angle correction value θp calculation is improved.

The idling check unit 52 determines it to be the idle rotation zone when the motor speed SPm is larger than the speed check threshold value SPth and the motor acceleration Am is equal to or larger than the first check threshold value Ath1. The idling check unit 52 further determines it to be the integral rotation zone when the motor speed SPm is larger than the speed check threshold value SPth and the motor acceleration Am is equal to or smaller than the second check threshold value Ath2 which is smaller than the first check threshold value Ath1. Thus, the idle rotation zone and the integral rotation zone can be appropriately set based on the motor speed SPm and the motor acceleration Am. The motor speed SPm is calculated in response to the interrupt generated in timed relation with each pulse edge of the motor rotation angle signal SgE. Thereby, the motor speed SPm can be calculated appropriately.

Second Embodiment

Figure 7:
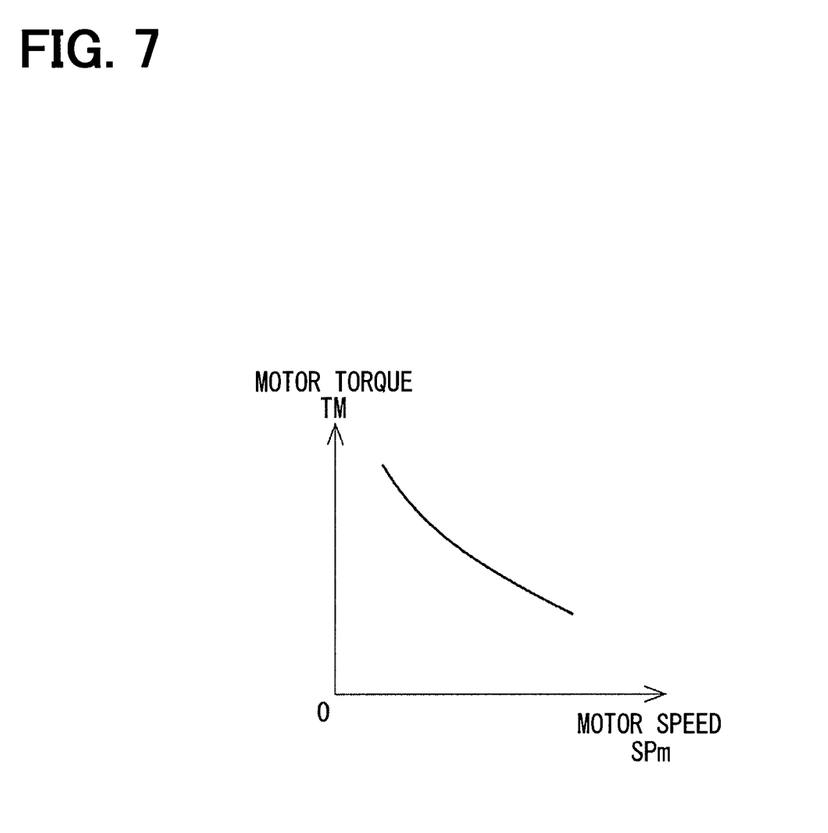
FIG. 7 is an explanatory graph for explaining a map used for calculating a motor torque according to a second embodiment.
Figure 8:
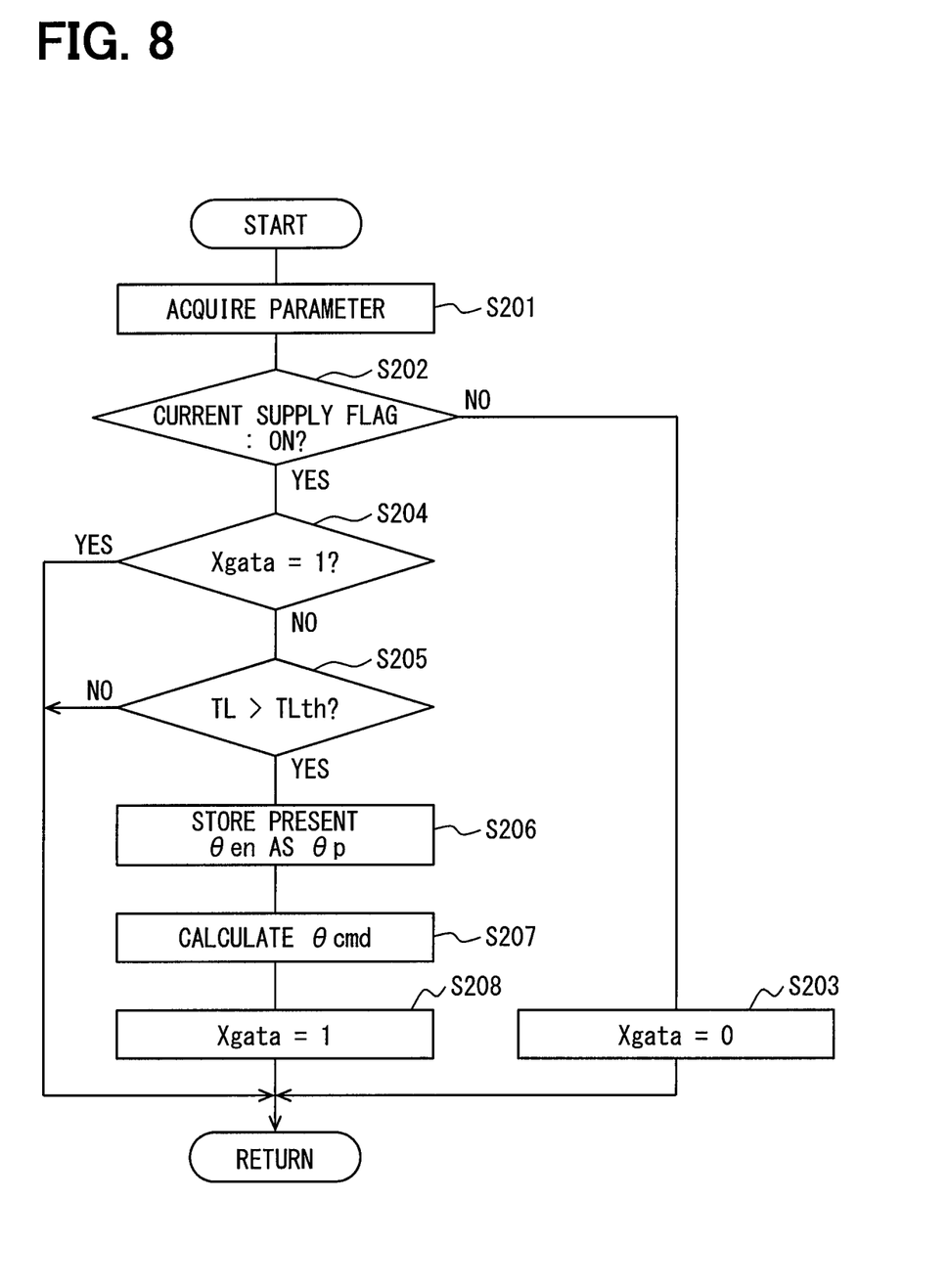
FIG. 8 is a flowchart showing a target angle setting process according to the second embodiment.

A second embodiment is shown in FIG. 7 to FIG. 9. In the present embodiment, the parameter calculation unit 51 calculates an estimated load torque TL [Nm] in addition to the motor speed SPm and the motor acceleration Am. The estimated load torque TL is calculated by the equation (7).

$$TL = TM_{(Spm)} - k \times Am \quad (7)$$

In the equation, $TM_{(Spm)}$ means a motor torque, which is a function based on the motor speed SPm. In the present embodiment, the motor torque TM is calculated using a map shown in FIG. 7. As shown in FIG. 7, the motor torque TM becomes a larger value as the motor speed SPm decreases. The constant k in the equation is a value corresponding to inertia. The estimated load torque TL calculated as above uses a filtered value for the idle rotation checking. Hereinafter, the estimated load torque TL is a value after filter processing.

A target calculation process in the present embodiment will be described with reference to a flowchart of FIG. 8. In S201, the idling check unit 52 acquires the parameter calculated by the parameter calculation unit 51. In particular, in the present embodiment, the estimated load torque TL is acquired. In S202, similarly to S102 in FIG. 4, the idling check unit 52 checks whether the current supply flag has been set. In case it is determined that the current supply flag has not been set (S202: NO), the process proceeds to S203 and the learning flag Xgata is reset. In case it is determined that the current supply flag has been set (S202: YES), the process proceeds to S204.

In S204, the idling check unit 52 checks whether the learning flag Xgata has been set. In case it is determined that the learning flag Xgata has been set (S204: YES), this routine ends. In case it is determined that the learning flag Xgata has not been set (S204: NO), the process proceeds to S205.

In S205, the idling check unit 52 checks whether the estimated load torque TL is larger than a load check threshold value TLth. In case it is determined that the estimated load torque TL is equal to or smaller than the load check threshold value TLth (S205: NO), this routine ends. In case it is determined that the estimated load torque TL is larger than the load check threshold value TLth (S205: YES), it is determined that the idle rotation state has ended, and the process proceeds to S206.

In S206, the idling check unit 52 stores the current encoder count value θen as the angle correction value θp in the storage unit such as a RAM (not shown). In S207, the target setting unit 55 calculates the target count value θcmd (see equation (6)) based on the angle correction value θp and the design value of the valley-to-valley angle θdet. In S208, the idling check unit 52 sets the learning flag Xgata.

The motor control process according to the present embodiment will be described with reference to a time chart of FIG. 9. In FIG. 9, the horizontal axis indicates the common time axis, and the vertical axis indicates from the top the motor angle, the motor torque TM, the motor speed SPm, the motor acceleration Am, and the estimated load torque TL. When the target shift range is changed at time x20, the current supply flag is set, the target count value θcmd is set to the provisional value θt, and driving of the motor 10 is started. Here, the motor 10 is assumed to rotate in the forward direction. When driving of the motor 10 is started, the encoder count value θen, the motor speed SPm and the motor acceleration Am increase. Also, as the motor speed increases, the motor torque TM decreases from the drive initial torque. Further, at time x21, when the rattle idle rotation state ends and the motor 10 and the output shaft 15 come to rotate integrally, the amounts of changes of the motor speed SPm and the motor torque TM become smaller. In addition, the motor acceleration Am decreases and the estimated load torque TL increases.

Here, the estimated load torque TL will be described. When the motor 10 rotates within the range of play, motor friction is a load. When the motor 10 rotates integrally with the output shaft 15, the output shaft friction and the spring force of the detent spring 25 become loads in addition to the motor friction. Therefore, a load torque T2 in the integral rotation zone is larger than a load torque T1 in the idle rotation zone. That is, T1<T2.

Therefore, in the present embodiment, the load check threshold value TLth is set to be a value between the load torques T1 and T2, and it is determined that the idle rotation state has ended at time x21 when the estimated load torque TL becomes larger than the load check threshold value TLth. Then, the encoder count value θen at this time is used as the angle correction value θp and the target count value θcmd is calculated based on the angle correction value θp. In FIG. 9, it is assumed that the target count value θcmd is changed at the same time as the target count value θcmd is calculated at time x21 by ignoring the calculation delay and the like. The timing at which the target count value θcmd is switched from the provisional value θt may be any timing before the detent roller 26 passes over the ridge section 210 of the detent plate 21.

In the present embodiment, the idling check unit 52 determines that the idle rotation state has ended when it is determined that the estimated load torque TL calculated based on the motor speed SPm and the motor acceleration Am is larger than the load check threshold value. By using the estimated load torque TL, it is possible to accurately determine the end of the idle rotation state with relatively simple processing. The present embodiment also provides the similar advantages as those of the above embodiment.

Other Embodiment

In the embodiments described above, the motor is the DC brushless motor. As another embodiment, the motor may be any motor, such as a switched reluctance motor. In the above embodiments, although the number of winding sets of the motor is not referred to, the number of winding sets may be one or plural. In the above embodiments, the motor rotation angle sensor is the encoder. As another embodiment, the motor rotation angle sensor need not necessarily be the encoder but may be any other devices such as a resolver. That is, the motor angle is not limited to the encoder count value but may be any value that can be converted into the motor angle.

In the above embodiments, no output shaft sensor is provided. In another embodiment, an output shaft sensor may be provided to detect the rotational position of the output shaft. For example, the end of the idle rotation state may be checked by using the detection values of the motor rotation angle sensor and the output shaft sensor when the output shaft sensor is normal, and the end of the idle rotation state may be checked based on the motor angle, the motor speed and the motor acceleration as in the above embodiments when the output shaft sensor becomes unusable due to a failure, etc.

In the above embodiments, the detent plate is provided with two valley sections. As another embodiment, the number of valley sections is not limited to two and may be any number. For example, four valley sections may be provided corresponding to respective ranges of P, R, N and D. The shift range switching mechanism and the parking lock mechanism or the like may be different from those of the embodiments described above.

In the above embodiments, the speed reducer is placed between the motor shaft and the output shaft. Although the detail of the speed reducer is not described in the embodiments described above, it may be configured by using, for example, a cycloid gear, a planetary gear, a spur gear that transmits torque from a reduction mechanism substantially coaxial with the motor shaft to a drive shaft, or any combination of these gears. As another embodiment, the speed reducer between the motor shaft and the output shaft may be omitted, or a mechanism other than the speed reducer may be provided. That is, according to the above embodiments, a configuration, in which the play between the motor shaft and the output shaft resides between the output shaft and the gears of the speed reducer, has been described. It is noted that, the play may be regarded as a sum of play, rattle or the like, existing between the motor shaft and the output shaft. The present disclosure is not limited to the above embodiments but various modifications may be made within the scope of the present disclosure without departing from the spirit of the disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A shift range control device for switching a shift range by controlling driving of a motor in a shift range switching system, in which a play exists between a motor shaft which is a rotation shaft of a motor and an output shaft to which the rotation of the motor is transmitted, the shift range control device comprising:
   a parameter calculation unit for calculating a motor angle, a motor speed and a motor acceleration based on a motor rotation angle signal acquired from a motor rotation angle sensor which detects a rotation position of the motor;
   an idling check unit for checking an end of an idle rotation state, in which the motor rotates within a range of the play, based on the motor speed and the motor acceleration;
   a target setting unit sets a motor angle target value related to drive control on the motor, by using an angle correction value which is a value corresponding to the motor angle at the end of the idle rotation state; and
   a drive control unit for controlling the driving of the motor such that the motor angle becomes the motor angle target value.

2. The shift range control device according to claim 1, wherein:
   the idling check unit checks, based on the motor speed and the motor acceleration, an idle rotation zone, in which the motor rotates idly, and an integral rotation zone, in which the motor shaft and the output shaft rotates integrally; and
   the idling check unit derives a first approximated line, which is an approximated line that represents a change with time of the motor speed in the idle rotation zone, and a second approximated line that is an approximated line that represents a change with time of the motor speed in the integral rotation zone, and determines the end of the idle rotation state at a timing when the first approximated line and the second approximated line cross.

3. The shift range control device according to claim 2, wherein the idling check unit determines, based on the motor speed and the motor acceleration:
   the motor is in the idle rotation zone when the motor speed is larger than a speed check threshold value and the motor acceleration is equal to or larger than a first check threshold value; and
   the motor is in the integral rotation zone when the motor speed is larger than a speed check threshold value and the motor acceleration is equal to or smaller than a second check threshold value smaller than the first check threshold value.

4. The shift range control device according to claim 1, wherein:
   the idling check unit determines the end of the idle rotation state when an estimated torque calculated based on the motor speed and the motor acceleration is larger than a load check threshold value.

5. The shift range control device according to claim 1, wherein:
   the motor speed is calculated in response to each interrupt generated at a pulse edge of the motor rotation angle signal.

6. The shift range control device according to claim 5, wherein:
   the process of checking the end of idle rotation checks, based on the motor speed and the motor acceleration, an idle rotation zone, in which the motor rotates idly, and an integral rotation zone, in which the motor shaft and the output shaft rotates integrally; and
   the process of checking the end of the idle rotation state derives a first approximated line, which is an approximated line that represents a change with time of the motor speed in the idle rotation zone, and a second approximated line that is an approximated line that represents a change with time of the motor speed in the integral rotation zone, and determines the end of the idle rotation state at a timing when the first approximated line and the second approximated line cross.

7. The shift range control device according to claim 6, wherein the process of checking the end of idle rotation state determines, based on the motor speed and the motor acceleration:
   the motor is in the idle rotation zone when the motor speed is larger than a speed check threshold value and the motor acceleration is equal to or larger than a first check threshold value; and
   the motor is in the integral rotation zone when the motor speed is larger than a speed check threshold value and the motor acceleration is equal to or smaller than a second check threshold value smaller than the first check threshold value.

8. A shift range control device for switching a shift range by controlling driving of a motor in a shift range switching system, in which a play exists between a motor shaft which is a rotation shaft of a motor and an output shaft to which the rotation of the motor is transmitted, the shift range control device comprising an electronic control unit configured to execute processes of:
   calculating a motor angle, a motor speed and a motor acceleration based on a motor rotation angle signal acquired from a motor rotation angle sensor which detects a rotation position of the motor;

checking an end of an idle rotation state, in which the motor rotates within a range of the play, based on the motor speed and the motor acceleration;

setting a motor angle target value related to drive control on the motor, by using an angle correction value which is a value corresponding to the motor angle at the end of the idle rotation; and controlling the driving of the motor such that the motor angle becomes the motor angle target value.

9. The shift range control device according to claim 8, wherein:

the process of checking the end of the idle rotation state when an estimated torque calculated based on the motor speed and the motor acceleration is larger than a load check threshold value.

10. The shift range control device according to claim 8, wherein:

the motor speed is calculated in response to each interrupt generated at a pulse edge of the motor rotation angle signal.

* * * * *